US007689985B2

(12) United States Patent
Callender

(10) Patent No.: US 7,689,985 B2
(45) Date of Patent: Mar. 30, 2010

(54) VERSIONING SUPPORT FOR DRIVERS FRAMEWORKS

(75) Inventor: Robin L. Callender, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 743 days.

(21) Appl. No.: 11/072,585

(22) Filed: Mar. 4, 2005

(65) Prior Publication Data

US 2006/0200817 A1 Sep. 7, 2006

(51) Int. Cl.
*G06F 9/44* (2006.01)
(52) U.S. Cl. ...................................... 717/175
(58) Field of Classification Search ............. None
See application file for complete search history.

(56) References Cited

U.S. PATENT DOCUMENTS

| | | | | |
|---|---|---|---|---|
| 5,465,364 | A * | 11/1995 | Lathrop et al. | 719/321 |
| 5,960,189 | A * | 9/1999 | Stupek et al. | 717/169 |
| 6,959,439 | B1 * | 10/2005 | Boike | 719/326 |
| 7,082,598 | B1 * | 7/2006 | Le et al. | 717/127 |
| 2002/0019864 | A1 * | 2/2002 | Mayer | 709/223 |
| 2003/0145127 | A1 * | 7/2003 | Unice | 709/321 |
| 2004/0181476 | A1 * | 9/2004 | Smith et al. | 705/35 |
| 2005/0039196 | A1 * | 2/2005 | Sasidharan | 719/331 |

OTHER PUBLICATIONS

David J. Brown and Karl Runge, "Library Interface Versioning in Solaris and Linux", the Proceedings of the 4th Annual Linux Showcase and Conference, Atlanta, Georgia, USA, Oct. 10-14, 2000.*
"Linker and Libraries Guide", Part No: 816-7777-10, Apr. 2003, Sun Microsystems, Inc.*
Bill Calkins, "Inside Solaris 9", Que, Nov. 2002.*

* cited by examiner

*Primary Examiner*—Philip Wang
(74) *Attorney, Agent, or Firm*—Wolf, Greenfield & Sacks, P.C.

(57) ABSTRACT

The subject invention relates to systems and methods that facilitate automatic version level updates of driver components in the context of an operating system framework. In one aspect, an automated computer versioning system is provided. The system includes a version library supplying various components of an operating system framework, wherein the version library defines revision levels and interfaces for the components of the operating system framework. A loader automatically distributes the interfaces in order to facilitate functional interactions with the operating system framework, whereby such distribution of the interfaces is based in part on a change in the revision levels.

21 Claims, 12 Drawing Sheets

VERSIONING SUPPORT FOR DRIVERS FRAMEWORKS

TECHNICAL FIELD

The subject invention relates generally to computer systems, and more particularly, relates to systems and methods that enable automated updates to platform libraries while mitigating impacts on functioning drivers.

BACKGROUND OF THE INVENTION

Operating system platforms have enabled the rapid growth of various technologies that are developed on such systems. Many of these platforms along with running many differing applications for developing the technologies also have become much easier to use when adding components such as hardware devices and associated drivers to the systems. For instance, in one area, some systems allow hardware or software components to be installed on the respective platforms, whereby these components in essence can be plugged into the system with a high degree of confidence that they will also cooperate with the system and other devices/components that have been previously installed. One common name for such technology is referred to as Plug and Play technology which enables devices or components to be easily integrated within an existing system.

Plug and Play technology generally relates to when a computer system automatically recognizes new devices and determines what driver software, resource settings, and so forth the device needs with very little or no interaction from the user. This technology also will typically only load a driver if it is needed since the hardware is currently detected as present. A driver is a software component that resides in between the operating system and the hardware and allows the operating system to communicate with the hardware. In some operating systems, "drivers" are software modules that can be inserted into an operating system kernel, allowing for support of specific hardware or for extension of the operating system or both. Generally, drivers run in a fully trusted mode, whereby any failure in these components can cause machine services to fail, or a full system crash. Thus, any successful effort to make drivers more resilient or fault tolerant usually causes greater system reliability and consequently customer satisfaction to increase.

One of the barriers to greater driver resilience is that a driver typically has to respond to many "events" generated by the operating system which may require the driver to initiate operations which can fail. For example, these events may be file handle creation, device insertion, power being turned off, statistics gathering, and so forth. Most of the time, the exact action that a driver should take in response to an internal failure is poorly defined. This is partly due to the operating system not always being designed to handle every conceivable set of failures, partly due to external documentation not covering every situation and partly due to certain failures that involve a large amount of judgment on the part of the driver designer. Furthermore, drivers are often constructed internally as large "state machines" wherein a response to an event can depend largely on which events have occurred in the past. After a failure occurs, the driver designer often has to immediately turn around and handle new events, even though the failure probably implies that new events are likely to fail as well.

In many situations, when bugs are discovered (or new features added) in drivers and their associated operating system components, software revisions are routinely sent out overtime to correct such problems. In many cases, the revisions can be downloaded over the Internet with a few "mouse clicks." Currently, the drivers and operating system components exist in a tightly-coupled relationship. In other words, if a bug were discovered in the operating system components with no fault to the driver, and a revision were to be required of the operating system, then in many cases, both the operating system and the driver would need to be updated. This type of arrangement is highly inefficient however. While the drivers may be perfectly operational and bug free, they should not have to necessarily be upgraded merely due to problems that have been detected in other portions of the system. Conversely, if a particular driver problem is discovered, new revisions propagated to the driver should have minimal impact on the rest of the system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that facilitate versioning support for operating system components while mitigating impact on non-versioned components of the system. In one aspect, a software registration architecture is provided that decouples operating system requirements from essential or core functionality provided by related components such as drivers. Thus, the subject invention moves operating system support functions that were previously operated by individual drivers of the system and shifts the functional support to framework components of the operating system. The drivers are then left to operate core functional aspects relating to the driver's specific domain of control. For example, a sound card driver can focus resources on managing audio streams as opposed to also supporting sound and operating system overhead. By segmenting system/driver functionality and providing automated processes to support substantially transparent versioning to the system and/or the respective drivers, the subject invention efficiently allows versioning to occur in one portion of the system, while mitigating effects of the versioning with respect to other portions.

In one particular aspect of the subject invention, a loader or agent is employed to intercede on behalf of driver components in view possible changes that may be occurring in framework or library components that are subject to the changes. Thus, if a software change were to be required of the framework, the change or version can be communicated and/or integrated with the respective driver via the loader. This can include mapping of Application Programming Interfaces (APIs) in order for the driver to continue to be able to operate in context of the newly versioned or updated framework. Also, version controls are provided to allow registration, management, and control of prospective changes to the collective system. Other aspects include support processes that allow major and minor versioning of the system. For instance, if a major revision were to occur and a driver found it was no longer compatible with the framework or operating system, automated procedures can be invoked to enable step-back functionality to occur where the system regresses back to a previous software state in order to allow the components of the system to operate while incompatibilities were determined.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that facilitate automatic version level updates of driver components in the context of an operating system framework. In one aspect, an automated computer versioning system is provided. The system includes a version library supplying various components of an operating system framework (e.g., event handlers, interrupt processors, library functions, power down state handlers, and so forth), wherein the version library defines revision levels and interfaces for the components of the operating system framework. A loader automatically distributes the interfaces in order to facilitate functional interactions with the operating system framework, whereby such distribution of the interfaces is based in part on a change in the revision levels. The version library can be updated or changed while mitigating affects on components that utilize the library such as drivers or other components.

As used in this application, the terms "component," "system," "object," "library," "driver," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
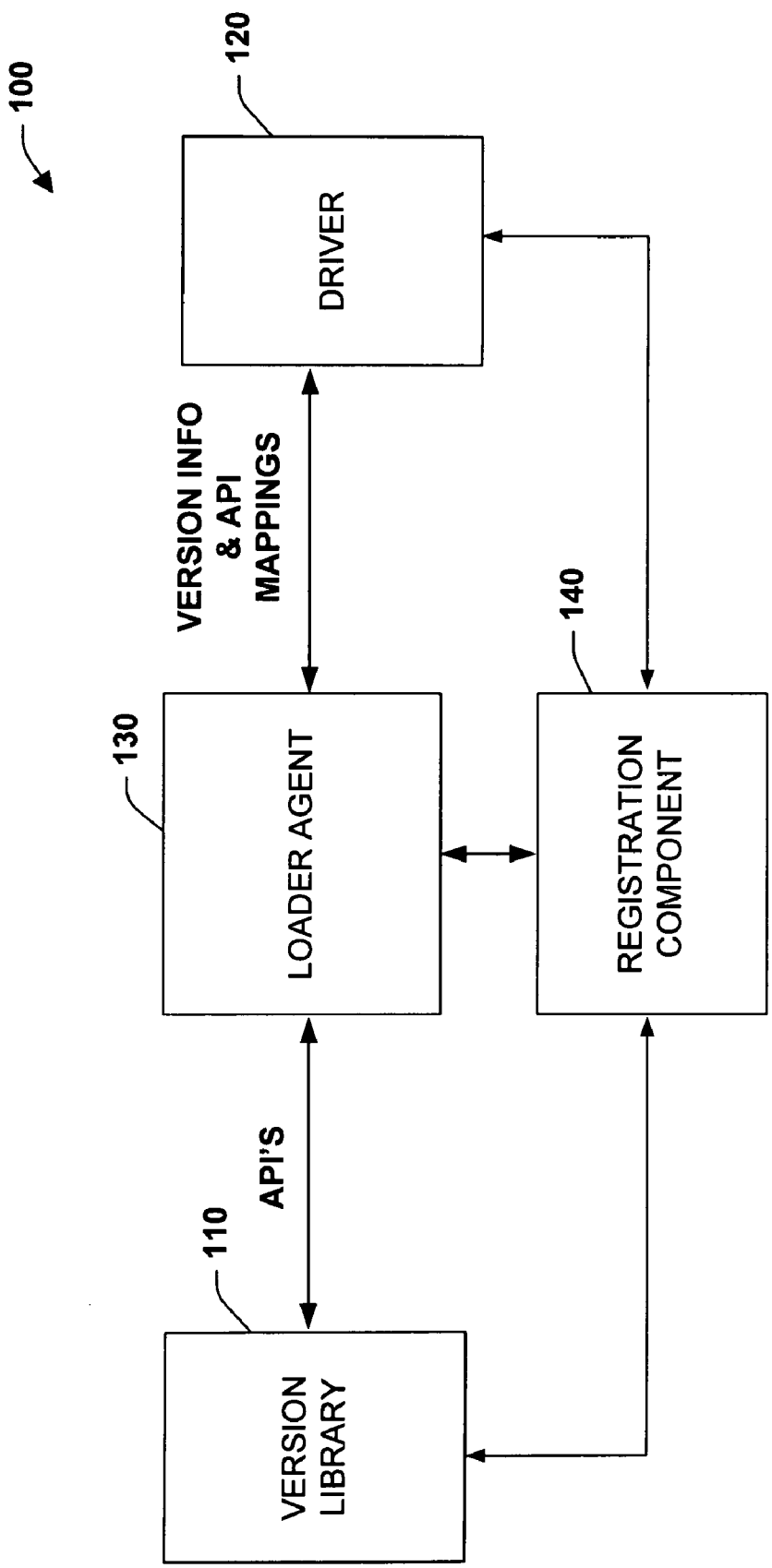
FIG. 1 is a schematic block diagram illustrating a registration and versioning system in accordance with an aspect of the subject invention.

Referring initially to FIG. 1, an automated versioning system 100 is illustrated in accordance with an aspect of the subject invention. The system 100 includes a version library 110 that includes functional components of an operating system framework (not shown). Such components in the library 110 are utilized by one or more driver components 120 (or drivers) in the operation of the driver and interactions of the driver with an operating system. In general, the version library 110 provides a level of service to the driver 120 where actual code written for the driver is focused on those aspects that are peculiar to the functionality of the driver. In this manner, version level updates can be made to the driver while mitigating code level changes to the driver. When a version level change is detected, a loader component 130 distributes updated functionality of the version library 110 to the drivers 120 by mapping one or more APIs and/or other version level information to the drivers. For instance, such mappings can include providing updated address or pointer tables that point to functions that are needed by the driver 120. A registration component 140 can be employed to manage the version level changes and automatically trigger updates between components of the system 100 upon detecting discrepancies between older and newer versions of the respective components.

In one aspect, the system 100 functions as a software registration architecture that decouples operating system requirements from essential or core functionality provided by the drivers 120. Thus, operating system support functions that were previously supplied by individual drivers 120 of the system 100 are migrated to framework components of the operating system represented by the version library 110. The drivers 120 are then left to operate core functional aspects relating to the driver's specific domain of control. For example, a mouse driver can focus resources on managing user inputs as opposed to also supporting the mouse and operating system overhead. By segmenting system/driver functionality and providing automated processes to support substantially transparent versioning to the system 100 and/or the respective drivers 120, versioning can occur in one portion of the system, while mitigating effects of the versioning with respect to other portions such as the drivers.

In one particular aspect, the loader 120 is employed to intercede on behalf of the drivers 120 in view of possible changes that may be occurring in framework or the version library 110 that are subject to the changes. Thus, if a software change were to be required of the framework, the change or version can be communicated and/or integrated with the respective driver 120 via the loader 130. This can include mapping of Application Programming Interfaces (APIs) in order for the driver to continue to be able to operate in context of the newly versioned or updated framework. Also, version controls are provided by the registration component 140 to allow registration, management, and control of prospective changes to the collective system 100. Other aspects include support processes that allow major and minor versioning of the system as will be described in more detail below. For instance, if a major revision were to occur and a driver 120 found it was no longer compatible with the framework or operating system, automated procedures can be invoked to enable step-back functionality to occur where the system regresses back to a previous software state in order to allow the drivers to operate while system incompatibilities were determined.

Figure 2:
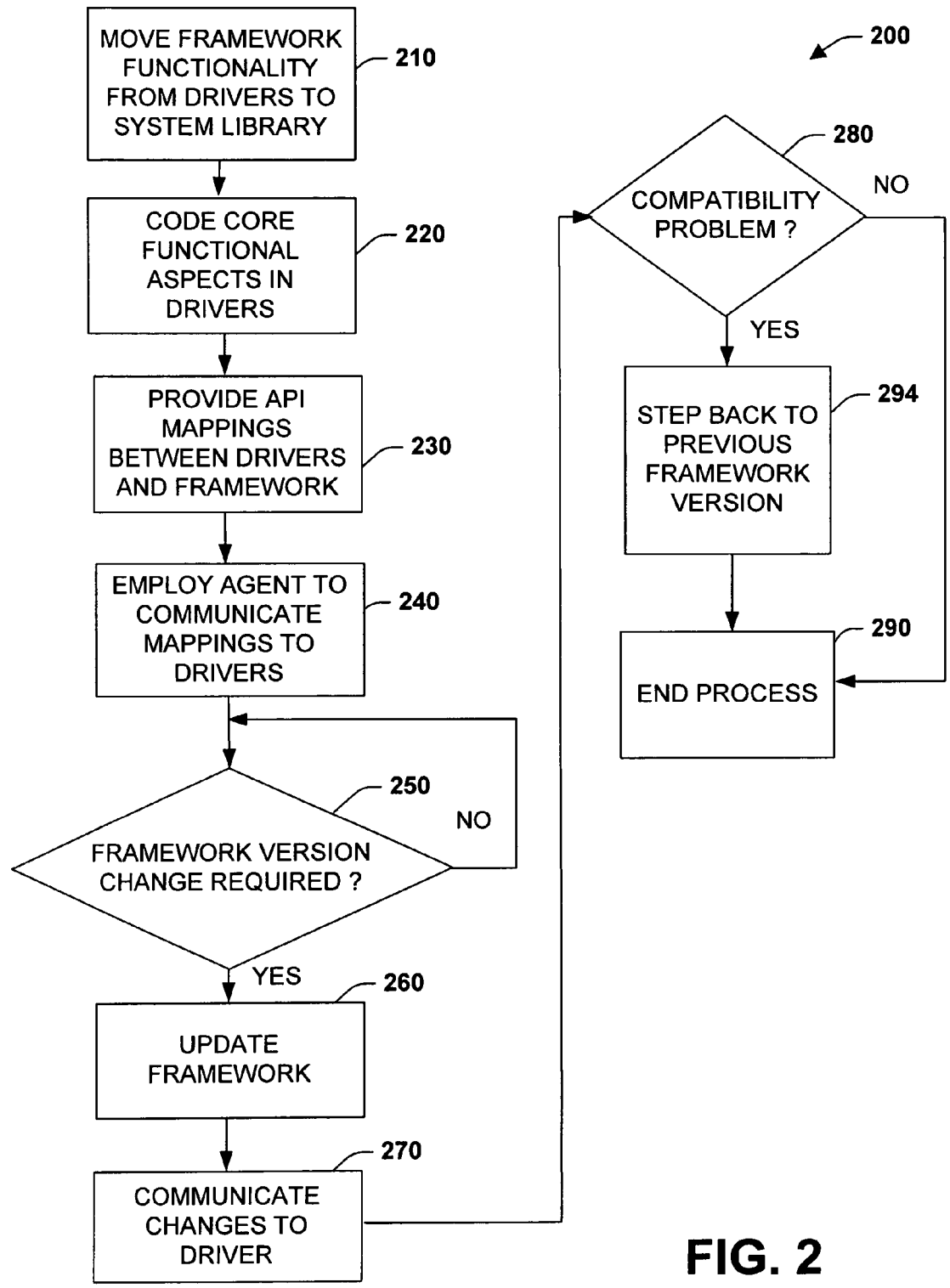
FIG. 2 is a flow diagram illustrating a versioning process in accordance with an aspect of the subject invention.

Referring now to FIG. 2, an automated versioning process is illustrated in accordance with an aspect of the subject invention. While, for purposes of simplicity of explanation, the methodology is shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Proceeding to 210 of FIG. 2, framework or operating system functionality is segmented from a driver's core functional aspects. Such functionality can be collected in a code version library, for example. At 220, the functional aspects of a respective driver are coded in the driver. For instance, printer driver would code printer interface functionality and a video driver would supply code for video display devices. Other coding features include providing calls to system library capabilities that cooperate with an operating system, for example. At 230, API or interface mappings are provided for drivers and functional components of the framework defined at 210. These mappings allow the drivers to call operating system functionality without explicitly supplying or supporting the functionality within the drivers. At 240, an automated agent is employed to communicate the mappings at 230 to the individual drivers or components of the computing system. Upon distribution, the drivers can call framework functionality as needed to support associated driver responsibilities.

Proceeding to 250, a decision is made as to whether or not a framework version update or change is required. If not, the process 200 proceeds to perform other tasks before returning to 250 to check for revision changes. If a version change is required at 250, the process proceeds to 260 to update the framework. At 270, framework changes are automatically communicated to the drivers. Such changes can be communicated as function pointer mappings and so forth that redirect previous calls of the drivers to newer or updated versions of the framework. At 280, after changes have been communicated at 270, a determination is made as to whether or not a compatibility problem exists between the drivers and the framework. If no incompatibility exists at 280, the process ends at 290. If an incompatibility is detected at 280, the process can automatically step back to a previous revision level in order that detected problems can be resolved. This can include re-loading an older version of the framework, and re-mapping the drivers back to the older or previous version that existed before a compatibility problem was detected at 280.

Before proceeding, it is noted that FIGS. 3-10 illustrate one particular example of an automated versioning system in accordance with the subject invention. For instance, many of the illustrated examples relate to a driver framework library (e.g., Windows Drivers Framework, WDF). It is to be appreciated that the versioning system of the subject invention can be provided according to various operating system platforms, libraries, and/or frameworks (e.g., Linux, Virtual Execution environments, managed code environments, and so forth).

Figure 3:
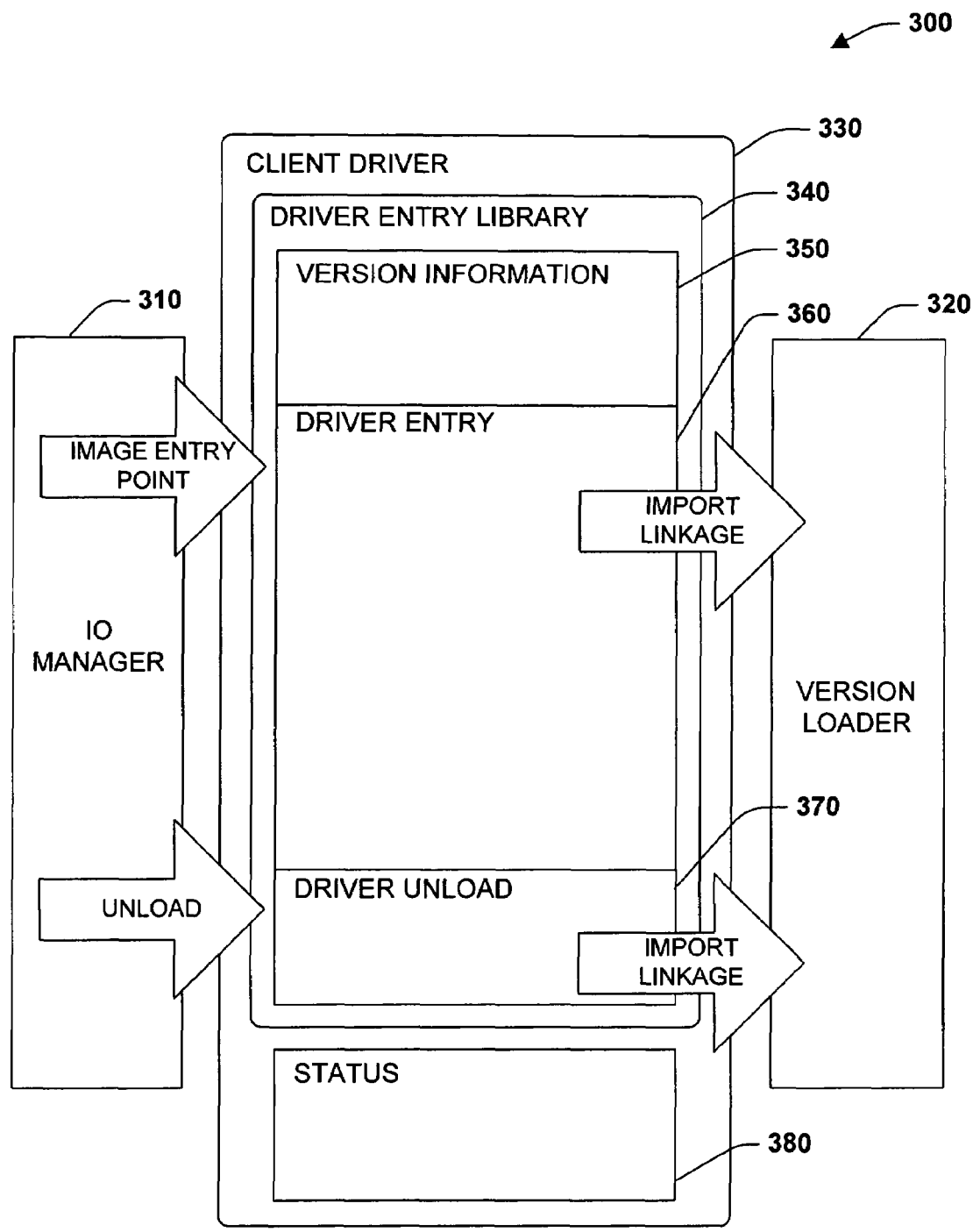
FIG. 3 illustrates an exemplary client startup and rundown process in accordance with an aspect of the subject invention.

FIG. 3 illustrates an example layout of a framework start-up and run-down operation for communications between an I/O manager 310 and a version loader 320. Generally, when a client driver 330 is constructed, it is statically linked with a WdfDriverEntry.lib 340, the static "stub" library. This library provides the run-time support routines to load and bind to a WDF dynamic library. The WDF BUILD environment can direct a linker to set the driver's image entry point to WdfDriverEntry rather than the driver's DriverEntry, for example. The WdfDriverEntry.lib 340 imports calls to the WDF version loader 320, WdfLdr.sys, via export lib WdfLdr.lib. Within the data section of the driver 320, the WdfDriverEntry library 340 can embed three (or more) structures of interest: the WdfVersion structure 350, the WdfFunctions table, and the WdfDriverGlobals pointer in a driver entry portion 360, wherein a driver unload portion 370, and a status section 380 can also be provided.

The WdfVersion structure 350 identifies the WDF version which the respective driver 330 was built and is expected to be dynamically bound to. This structure contains the major version number, the minor version number and a build (QFE) number, for example. In general, the major and minor version numbers are used to bind to a WDF version library. The build number is the distribution (build) of the WDF libraries. The WdfFunctions table is an array of pointers to WDF API functions. This table can be filled as part of the registration of the client driver 320 with the version library. The WdfDriverGlobals pointer references a client driver-context area which should be passed on each WDF API call. This pointer is not specified or apparent to the driver developer and is set within each WDF API thunk. The following is a specific code example relating to, the version information portion 350, the driver entry portion 360, the driver unload portion 370, and the status portion 380 of FIG. 3. Bolded item sections of this code will be described in more detail below.

---

Section 3A - Version Information 350
WDF_VERSION_INFO WdfVersion = {
  WDF_MAJOR_VERSION,
  WDF_MINOR_VERSION,
  WDF_BUILD_NUMBER,
  (enumWdfLastFunction –1,
  (WDFFUNC*) &WdfFunctions
};
WDFFUNC WdfFunctions [enumWdfLastFunction –1];
PWDF_DRIVER GLOBALS WdfDriverGlobals = NULL;
PFNDRIVERUNLOAD pfnDisplacedDriverUnload;
Section 3B1 - Driver Entry 360
NTSTATUS
FxDriverEntry(
  PDRIVER_OBJECT DrvObj,
  PUNICODE_STRING RegPath
  )
{
  WDFSTATUS status;
  status = WdfVersionBind( DrvObj, Section 3B2
        RegPath,
        &WdfVersion,
        &WdfDriverGlobals );
  if (!NT_SUCCESS(status)) {
    return status;
  }
  status = GsDriverEntry( DrvObj, RegPath ); Section 3B3
    Section 3B4
  if (NT_SUCCESS(status)) {
    if (DrvObj->DriverUnload != NULL){
      pfnDisplacedDriverUnload =

-continued

```
        DrvObj->DriverUnload;
    }
    DrvObj->DriverUnload = FxDriverUnload;
    }
    return status;
}
        Section 3C - Driver Unload 370
VOID
FxDriverUnload( PDRIVER_OBJECT DrvObj )
{
    if (pfnDisplacedDriverUnload)
        pfnDisplacedDriverUnload( DrvObj );
    WdfVersionUnbind( &WdfVersion );
}
        Section 3D - Status 380
NTSTATUS
DriverEntry(
    PDRIVER_OBJECT DrvObj,
    PUNICODE_STRING RegPath
    )
{
    // standard WDF driver stuff here.
    return status;
}
NTSTATUS
DriverUnload(
    PDRIVER_OBJECT DrvObj
    )
{
    // optional driver unload.
}
```

At Section 3B1 above, for the driver entry 360, the following loading operations may occur. The kernel loader 320 calls the driver's entry point (EP), as marked in the image header. This can be the first code to be executed in the driver image. The standard DriverObject and RegisteryPath pointers can be present. At code Section 3B2 above, WdfDriverEntry calls the WdfVersionBind in the WDF Version Loader to request being bound to the WDF library specified in the driver's WdfVersion structure. Note the parameters to this call are a pointer to the driver's WdfVersion structure and a pointer to the driver's WdfDriverGlobals pointer. Internally the WdfVersion structure includes a pointer to the WdfFunctions table and its size. Upon successful completion of the WdfVersionBind call, the WdfFunctions table can be filled with pointers to suitable API points within the WDF Version and the WdfDriverGlobals structure can be allocated and initialized.

At Section 3B3 above, WdfDriverEntry indirectly calls the driver specific DriverEntry via GsDriverEntry. The GsDriverEntry provides a level of "buffer overrun" safety at minimal cost. At Section 3B4 above, after the client DriverEntry has returned with a successful status, the driver's unload routine is again checked and if it was displaced, the unload routine is retained as the "displaced" unload routine. The WdfDriverUnload is inserted as the driver's unload routine.

At unload time, kernel load/unload services call the unload routine specified in the driver's DriverObject as shown in Section 3C above. This routine is WdfDriverUnload as illustrated. The WdfDriverUnload will first call any displaced unload routine, then WdfDriverUnload will call the WDF Version Loader's WdfVersionUnbind routine to request disassociation with the specified version library. As illustrated in Section 3D above, status can be returned regarding the drivers entry and unload operations.

Figure 4:
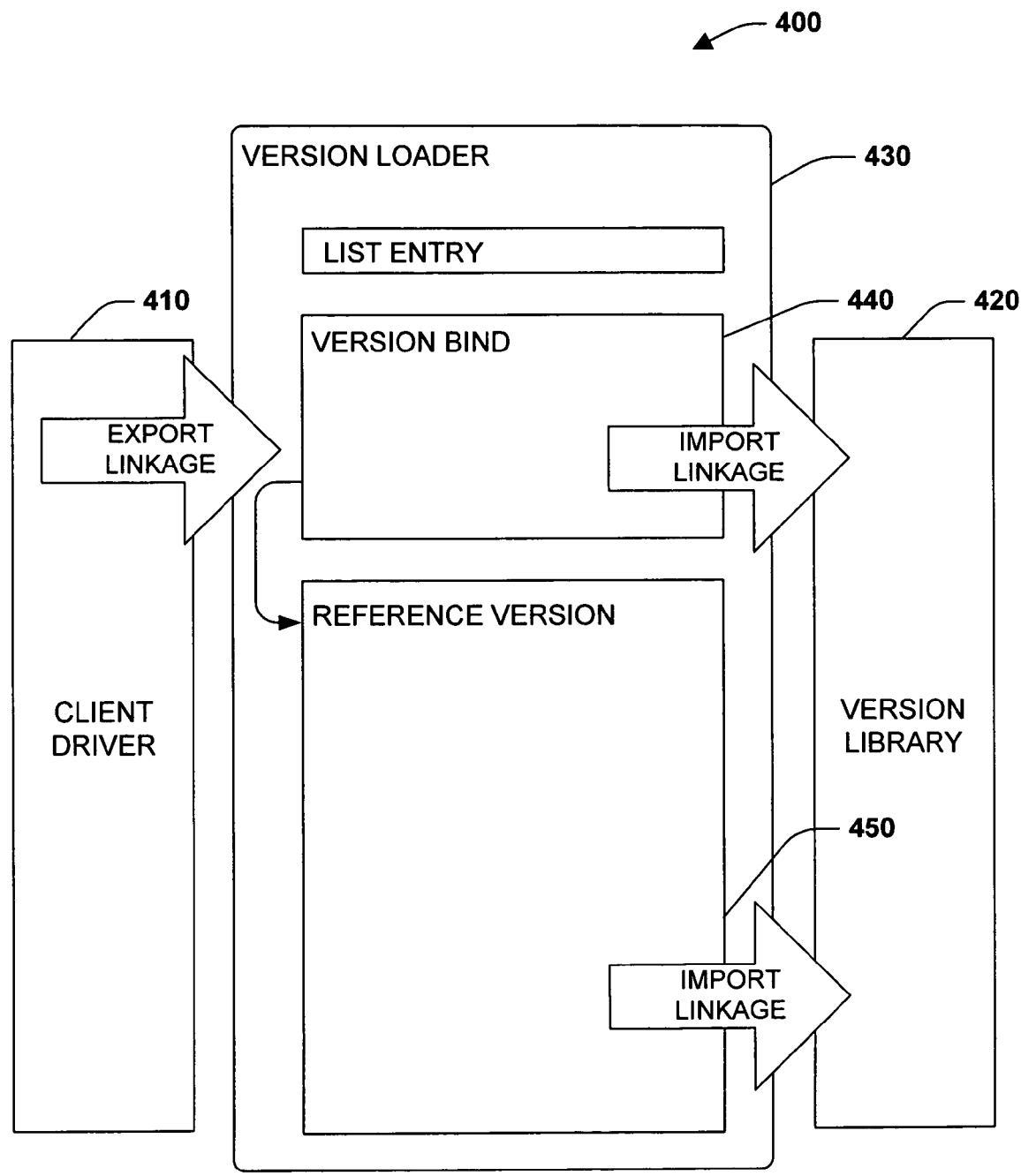
FIG. 4 illustrates an exemplary version loader and client binding to a version process in accordance with an aspect of the subject invention.

FIG. 4 illustrates the organization of a Version Loader and the sequence of processing for version bind requests. In this aspect, a client driver 410 interfaces to a version library 420 via a version loader 430. The Version Loader 430, e.g., WdfLdr.sys, is built as an EXPORT_DRIVER and its associated WdfLdr.lib 420 provides export linkage for client drivers 410. The following is a specific code example of a version bind section 440 of the version loader 430 and a reference version section 450 of the version loader in FIG. 4. Bolded item sections of this code will be described in more detail below.

```
LIST_ENTRY gLoadModuleList;
NTSTATUS                        Section 4A1
WdfVersionBind{
    PDRIVER_OBJECT DrvObj,
    PUNICODE_STRING RegPath,
    PWDF_VERSION_INFO Version,
    PWDF_DRIVER_GLOBALS * WdfDriverGlobals
    )
{
    status = ReferenceVersion( Version, &Library ); Section 4A2
    pfnWdfRegisterClientDriver =
        GetProcAddress( Library, "WdfRegisterClientDriver");
    status = pfnWdfRegisterClientDriver( Version, Section 4A3
                                        WdfDriverGlobals);
    return status;
}
NTSTATUS
ReferenceVersion{
    IN PWDF_VERSION_INFO Version,
    OUT PVOID       * Library
    )
{
    GetVersionServicePath( Version, &Service ); Section 4B1
    GetVersionImageName( Service, &ImageName );
    module = FindModuleByImageName( Service, ImageName );
    if (module) {                   Section 4B2
        // Version already loaded. Use it.
        *Library = module->ImageAddress;
        return SUCCESS;
    }
    //
    // Construct new Module for this Version Section 4B3
    //
    module = ExAllocatePool(PagedPool, sizeof(LOADED_MODULE);
    module->Service = Service;
    module->ImageName = ImageName;
    ZwLoadDriver( module->Service );
    module->ImageAddress = GetImageBase( module->ImageName );
    InterlockedIncrement( &module->RefCount );
    InsertHeadList( &gLoadModuleList, &module->Linkage );
    //
    // Call Versions's exported DllInitialize routine    Section 4B4
    //
    pfnDllInitialize = GetProcAddress( module->ImageAddress,
    "DllInitialize" );
    status = pfnDllInitial( );
    //
    // Return Version's handle.          Section 4B5
    //
    *Library = module->ImageAddress;
    return status;
}
```

At Section 4A1 above, the WdfDriverEntry.lib imports the WdfVersionBind call via the WdfLdr.lib thereby linking to the Version Loader 430. The client-side WdfDriverEntry calls WdfVersionBind, passing a pointer to the client's WdfVersion structure and a pointer to a WdfDriverGlobals pointer. Note that WdfVersionBind is an exported API from the WDF Version Loader, WdfLdr.sys, for example. At Section 4A2 above, WdfVersionBind calls ReferenceVersion, passing the WDF_VERSION_INFO structure pointer (Version) and a pointer to receive a library handle (Library).

At Section 4B1 above, ReferenceVersion 440 attempts to locate the Service Key associated with the version levels specified in the WDF_VERSION_INFO structure. This Service key is then used to retrieve the ImageName from the Service key. The ImageName identifies the actual file name for the library, for example WdfDynamic.sys may be the image name. The ImageName is used to scan the list of already-loaded version library modules, as anchored by gLoadedModuleList. At Section 4B2 above, if the version library module is already loaded, e.g., it was located, then no further processing is required and the version library module handle is returned.

At Section 4B3 above, since the version library module was not found, an attempt is made to load the version library 420. A new version library module structure is allocated and initialized. As version libraries are built as EXPORT_DRIVER, an attempt is made to load the version library via ZwLoadDriver, for example. After the version library has been loaded, a call to GetImageBase returns the image header pointer (this is conceptually similar to a LoadLibray call in user-mode). Finally, the version library module is linked to the global list of loaded version library modules at gLoadedModuleList. At Section 4B4 above, since the basic flow of initialization for version libraries is modeled after DLLs, the next operation is to resolve the version library's DllInitialize exported API and call it.

At Section 4B5 above, ReferenceVersion's last action is to set the version library module handle and return. At Section 4A3 above in the version bind section 440 of FIG. 4, WdfVersionBind can now resolve and call the version library's WdfRegisterClientDriver exported API. The parameters to this call are the WDF_VERSION_INFO structure pointer and the pointer to the WdfDriverGlobals pointer. The WdfRegisterClientDriver routine can fill the WdfFunctions table, as referenced in the WDF_VERSION_INFO structure and also create and initialize a new WDF_DRIVER_GLOBALS structure and set its pointer in the pointer to WdfDriverGlobals.

Figure 5:
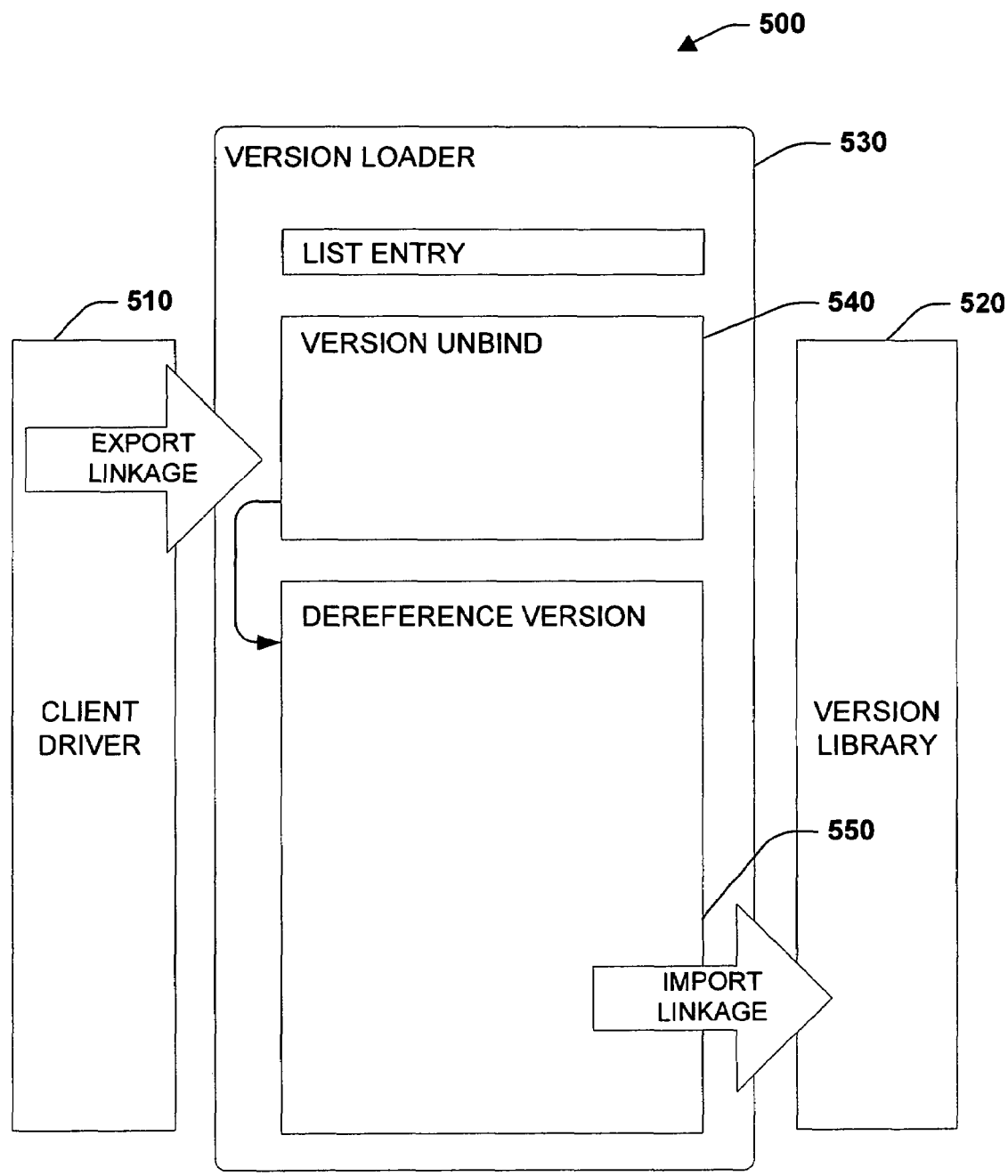
FIG. 5 illustrates an exemplary version loader and unbinding to a client version process in accordance with an aspect of the subject invention.

FIG. 5 illustrates the organization of a Version Loader and the sequences of processing for version unbind requests. Similar to FIG. 4, a client driver 510 interfaces to a version library 520 via a version loader 530. The Version Loader 530, WdfLdr.sys, is built as an EXPORT_DRIVER and its associated WdfLdr.lib provides export linkage for client drivers. In this example, a WdfDriverEntry.lib imports a WdfVersionUnbind call via the WdfLdr.lib, thereby linking to the Version Loader 530. The following is a specific code example of a version unbind section 540 of the version loader 530 and a dereference version section 550 of the version loader in FIG. 5. Bolded item sections of this code will be described in more detail below.

```
LIST_ENTRY gLoadModuleList;
NTSTATUS                    Section 5A1
WdfVersionUnbind{
    PWDF_VERSION_INFO Version
    )
{
    status = DereferenceVersion( Version ); Section 5A2
    return status;
}
NTSTATUS
DereferenceVersion{
    IN PWDF_VERSION_INFO Version
    )
{
    GetVersionServicePath( Version, &Service );    Section 5B1
    GetVersionImageName( Service, &ImageName );
    module = FindModuleByImageName( Service, ImageName );
    if (module) {
        // Version not found, return error (why?!?)
        return UNSUCCESSFUL;
    }
```

```
//
// Decrement reference count for this module    Section 5B2
//
count = InterlockedDecrement( &moudle->RefCount );
if (count > 0) {
    // Version still has depends, just return
    return SUCCESS;
}
//
// Call Version's exported DllUnload routine    Section 5B3
//
pfnDllUnload = GetProcAddr( module->ImageAddress,
            "DllUnload" );
status = pfnDllUnload( );
//
//
//
ZwUnloadDriver( module->Service );    Section 5B4
//
// Remove module from list and free resources
//
RemoveEntryList( &module->Linkage ); Section 5B5
ExFreePool( Service );
ExFreePool( ImageName );
ExFreePool( module );
return status;
}
```

At Section 5A1 above, the client-side WdfDriverUnload (in the WdfDriverEntry.lib stub) calls WdfVersionUnbind, passing a pointer to the client's WdfVersion structure. Note that WdfVersionUnbind is an exported API from the WDF Version Loader 530, WdfLdr.sys. At Section 5A2 above, the WdfVersionUnbind calls DereferenceVersion, passing the WDF_VERSION_INFO structure pointer (Version).

At Section 5B1 above, DereferenceVersion attempts to locate the Service Key associated with the version levels specified in the WDF_VERSION_INFO structure. This Service key is then used to retrieve the ImageName from the Service key. The ImageName identifies the actual file name for the library, for example WdfDynamic.sys could be the image name. The ImageName is used to scan the list of already-loaded version library modules, as anchored by gLoadedModuleList. At Section 5B2 above, if the version library module is not located, a serious error has possibly occurred. Possible response could be to indicate a failure to unbind in the returned status, or to BugCheck. If the version library module was found, the version library module's reference count is decremented. If the version library module's reference count is non-zero, indicating there are still other drivers associated with this version library, then return with a SUCCESS status is possible.

At Section 5B3 above, the version library module's reference count is zero, indicating there are not dependent client driver bound to this version library 520. The version library's "DllUnload" exported API routine is resolved and called. At Section 5B4 above, the kernel API ZwUnloadDriver is called to unload the version library 520 from memory. At Section 5B5 above, the version library module is removed from the list of loaded version library modules and its resources released.

Figure 6:
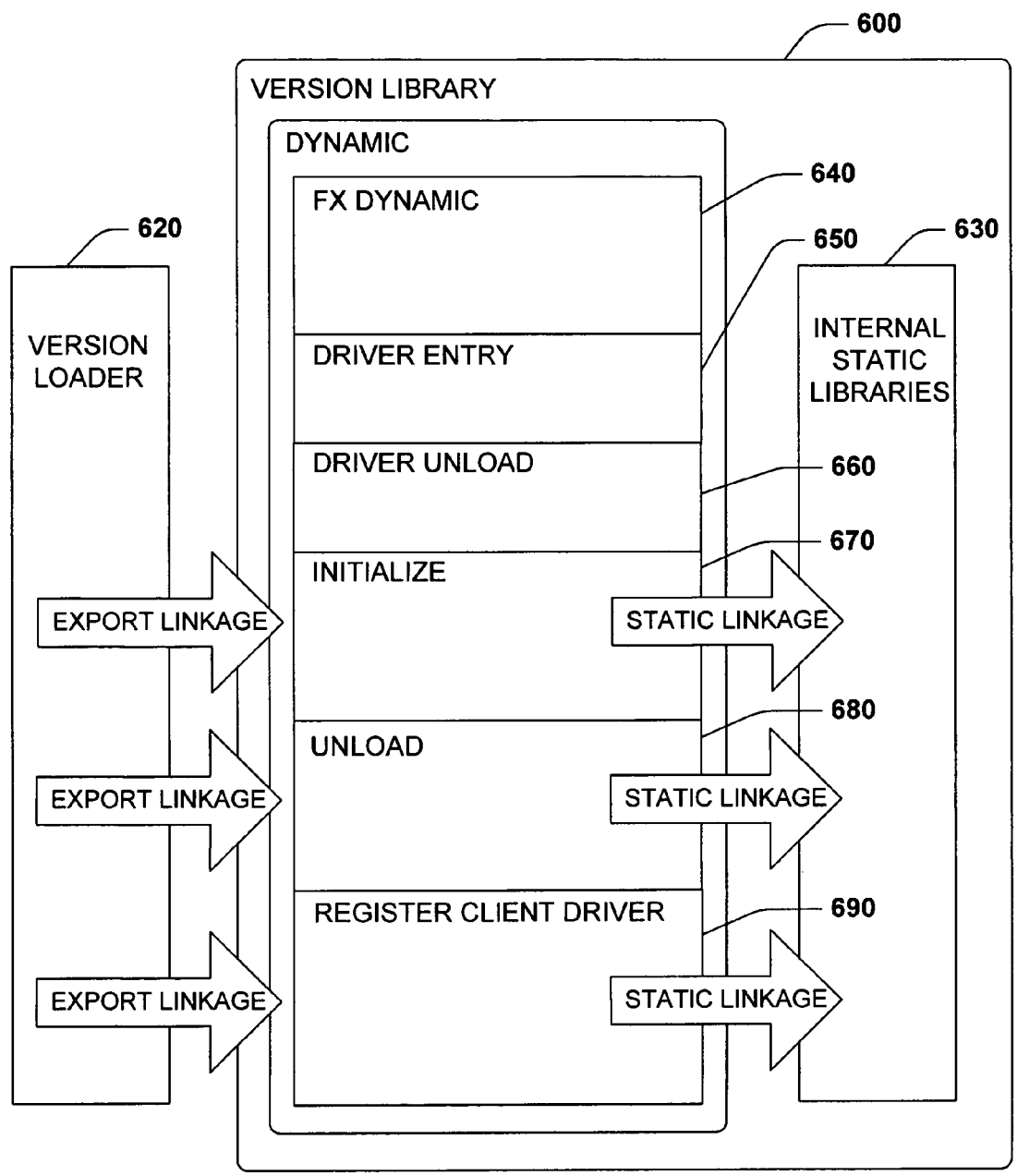
FIG. 6 illustrates an exemplary version library in accordance with an aspect of the subject invention.

FIG. 6 illustrates the layout of an example version library 600. This can include dynamic mappings for a version loader 620 and internal static libraries 630. Other structures of the version library 600 include dynamic components at 640, driver entry components at 650, driver unload components at 660, initialization components 670, unload components 680, and/or registration components 690. The following code example includes functional aspects highlighted in bold that relate to the components depicted at 650-690.

```
#include FxDynamic.h // generated by WdfStubs.exe
    typedef struct_WDFVERSION {
        LONG    Size;
        LONG    FuncCount;
        WDFFUNCTIONS Functions;
    } WDFVERSION, * PWDFVERSION;
    WDFVERSION WdfVersion = {
        sizeof(WDFVERSION),
        sizeof(WDFFUNCTIONS)/sizeof(PVOID),
        {
            imp_WdfCollectionCreate,
            imp_WdfCollectionGetCount,
            ...
            imp_WdfWorkItemGetAssociatedObject
        }
    };
NTSTATUS        Section 6A1
DriverEntry{PDRIVER_OBJEC DrvObj,
PUNICODE_STRING RegPath)
{
    DrvObj->DriverUnload = WdfUnload;
    return SUCCESS;
}
NTSTATUS
DriverUnload{PDRIVER_OBJEC DrvObj)
{
    return SUCCESS;
}
NTSTATUS        Section 6A2
DllInitialize{PUNICODE_STRING RegPath)
{
    status = FxDllGlobalCommission( );
    return status;
}
VOID
DllUnload{VOID)
{
    FxDllGlobalDecommission( );
}
NTSTATUS        Section 6A3
WdfRegisterClientDriver{
    PWDF_VERSION_INFO Version,
    PWDF_DRIVER_GLOBALS * WdfDriverGlobals
    )
{
    *WdfDriverGlobals = FxAllocateDriverGlobals( );      Section 6A4
    RtlCopyMemory( Version->FuncTable,                   Section 6A5
        &WdfVersion.Functions,
        Version->FuncCount * sizeof(PVOID) );
    return status;
}
```

Generally, there are not "hard" linkages to the version library 600, either static or dll-type. Typically, versioning-support API calls are conducted through a LoadLibray and GetProcAddress type mechanism. The WDF version library should be written as an EXPORT_DRIVER (e.g., it has both a DriverEntry and a DriverUnload routine) and export the following APIs: DllInitialize, DllUnload and WdfRegisterClientDriver. Also, the version library 600 should be given a unique name which reflects the version it contains. An example might be "WDF02051234.sys. This would be parsed as "a WDF version library with major version number 02, minor version number 05, and build number 1234" for example.

Referring to Section 6A1 code example above, since the version library 600 is built as an EXPORT_DRIVER and loaded when the WDF Version Loader calls ZwLoadDriver, the version library's DriverEntry is called by the system loader. This DriverEntry will set its driver unload routine in its DriverObject. At Section 6A2 above, the version loader calls this WDF version library's DllInitialize routine, allowing it to perform any library-wide initialization. This routine is called after the version library 600 has been loaded. The DllInitialize routine wraps a call to the WDF routine "FxDllGlobalsCommission" which is packaged in the common WDF "core" static library.

At Section 6A3 above, The WDF version loader calls this WDF version library's WdfRegisterClientDriver routine, for each WDF client driver requesting to be bound to this WDF version library. At Section 6A4 above, WdfRegisterClientDriver requests the WDF "core" routine "FxAllocateDriverGlobals" to create and initialize a new FX_DRIVER_GLOBALS structure for this client driver. Note that FxAllocateDriverGlobals does not return a pointer to the base FX_DRIVER_GLOBALS structure, but rather to the contained Public field within the FX_DRIVER_GLOBALS structure. At Section 6A5 above, WdfRegisterClientDriver fills the client's Wdfunctions table, the array of this WDF version library's APIs. The simplest form is a copy of the version library's WdfVersion Function array into the client driver's FuncTable (referenced in the client's WDF_VERSION_INFO pointer).

Figure 7:
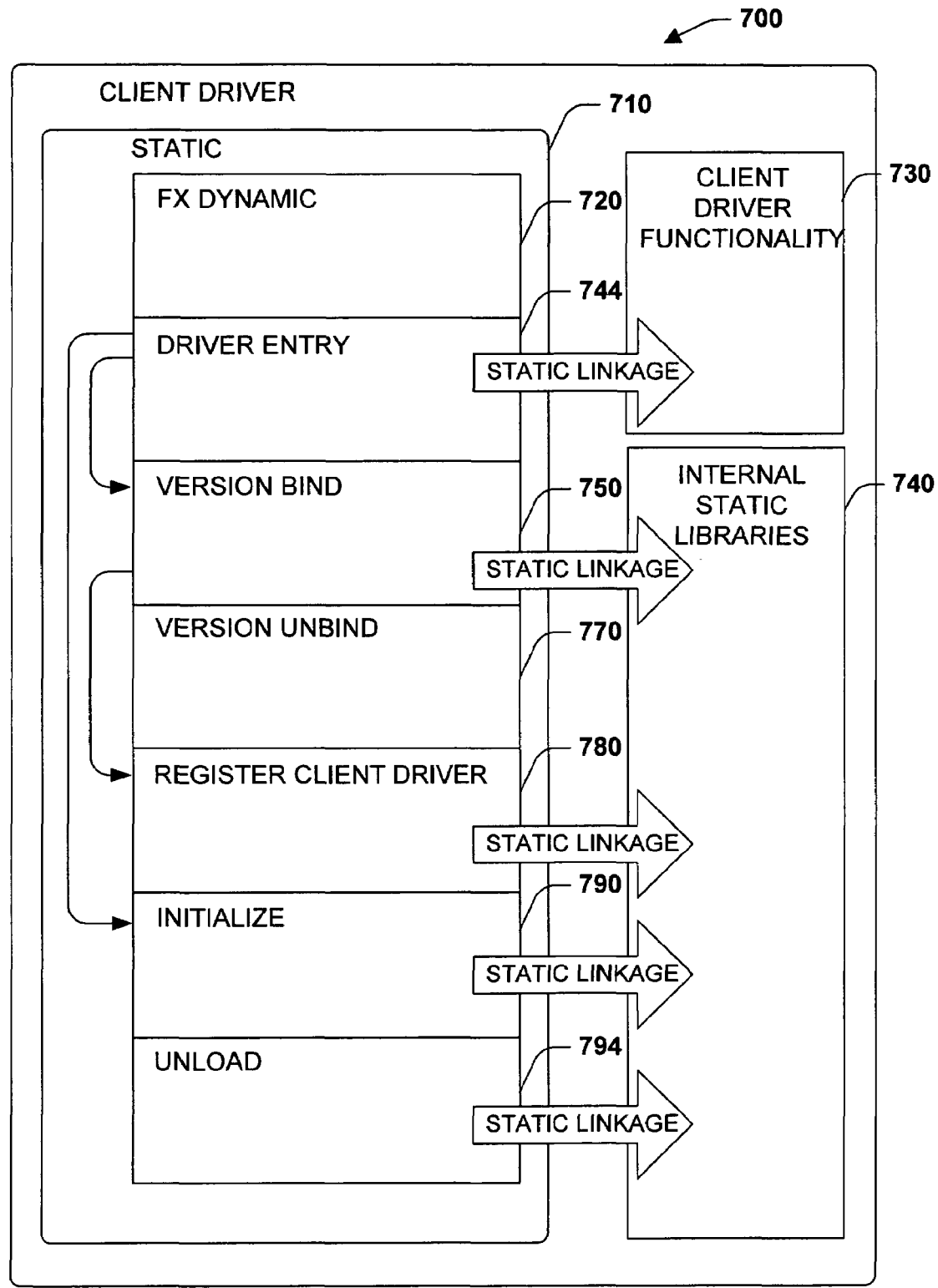
FIG. 7 illustrates an exemplary static version library in accordance with an aspect of the subject invention.

FIG. 7 illustrates an example layout of a start-up and run-down routine for statically linked client drivers. In this example, a client driver includes links to both static and dynamic portions at 710 and 720 respectively. The client driver 700 can interface to both driver functional components at 730 and to internal static libraries at 740. Other aspects of the driver 700 include driver entry points 744, version bind points 750, version unbind points at 770, registration aspects at 780, initialization components 790, and unload components 794. One aspect to the client side driver 700 is that the client-side functions 730 and associated version library functions are provided with the same function signature as with the dynamic-link environment. Since the client driver 700 is statically bound to the version, e.g., the client and version are packaged together; the role of the version loader is reduced. One purpose of providing this near-complete reflection of the dynamic version processing is to facilitate that the switching between static and dynamic packaging will not introduce significantly different execution paths which can aid in test coverage. To build the client driver 700 as a static package, the client driver is linked using "WdfStatic.lib" instead of "WdfLdr.lib" described above. The following code example depicts various aspects of the client driver 700 which are highlighted in bolded sections and described in more detail below.

```
#include FxDynamic.h
    WDFVERSION WdfVersion = {...};
    WDF_VERSION_INFO WdfVersionStatic = {...,...,...,...};
    WDFFUNC WdfFunctions [enumWdfLastFunction - 1];
    PWDF_DRIVER_GLOBALS WdfDriverGlobals = NULL;
    PFNDRIVERUNLOAD pfnDisplacedDriverUnload;
NTSTATUS        Section 7A1
WdfDriverEntry{PDRIVER_OBJEC DrvObj, PUNICODE_STRING
RegPath)
{
    DllInitialize( RegPath );   Section 7A2
    WdfVersionBind( DrvObj, RegPath, Section 7A3
        &WdfVersionStatic, &WdfDriverGlobals );
    DrvObj->DriverUnload = WdfDriverUnload;
    status = GsDriverEntry( DrvObj, RegPath ); Section 7A7
    if (NT_SUCCESS(status) &&
        DrvObj->DriverUnload != WdfDriverUnload) {
        pfnDisplacedDriver = DrvObj->DriverUnload;   Section 7A8
        DrvObj->DriverUnload = WdfDRiverUnload;
    }
    return status;
```

-continued

```
}
NTSTATUS
WdfVersionBind{
    PDRIVER_OBJEC DrvObj,
    PUNICODE_STRING RegPath,
    PWDF_VERSION_INFO Version,
    PWDF_DRIVER_GLOBALS WdfDriverGlobals
    )
{
    return WdfRegisterClientDriver(Version, WdfDriverGlobals) Section 7A4
}
NTSTATUS
WdfVersionUnbind{ PWDF_VERSION_INFO Version )
{
    return SUCCESS;
}
NTSTATUS
WdfRegisterClientDriver{
    PWDF_VERSION_INFO Version,
    PWDF_DRIVER_GLOBALS * WdfDriverGlobals
    )
{
    *WdfDriverGlobals = FxAllocateDriverGlobals( );      Section 7A5
    RtlCopyMemory( Version->FuncTable, &WdfVersion.Functions,
            Section 7A6 Version->FuncCount * sizeof(PVOID) );
    return status;
}
NTSTATUS
DllInitialize{PUNICODE_STRING RegPath)
{
    return FxDllGlobalsCommission( );
}
VOID
DllUnload{VOID)
{
    FxDllGlobalsDecommission( );
}
```

At Section 7A1 above, the system loader calls WdfDriverEntry, the image-specified entry point. At Section 7A2 above, he DllInitialize function is called, which wraps the WDF "core" FxDllGlobalsCommission. At Section 7A3 above, WdfVersionBind is called with the same function signature as the dynamic side. At Section 7A4 above, the WdfVersionBind calls the WdfRegisterClientDriver, as there is generally no need to load the version library. At Section 7A5 above, WdfRegisterClientDriver invokes the "core" FxAllocateDriverGlobals, in the same manner as the dynamic-side processing. At Section 7A6 above, WdfRegisterClientDriver resolves the WDF APIs in the same manner as the dynamic-side processing. At Section 7A7 above, WdfDriverEntry calls the client drivers' DriverEntry. At Section 7A8 above, if the WdfDriverUnload routine was displaced, then the displaying function address is retained and WdfDriverUnload is re-established as the DriverObject's unload routine.

Figure 8:
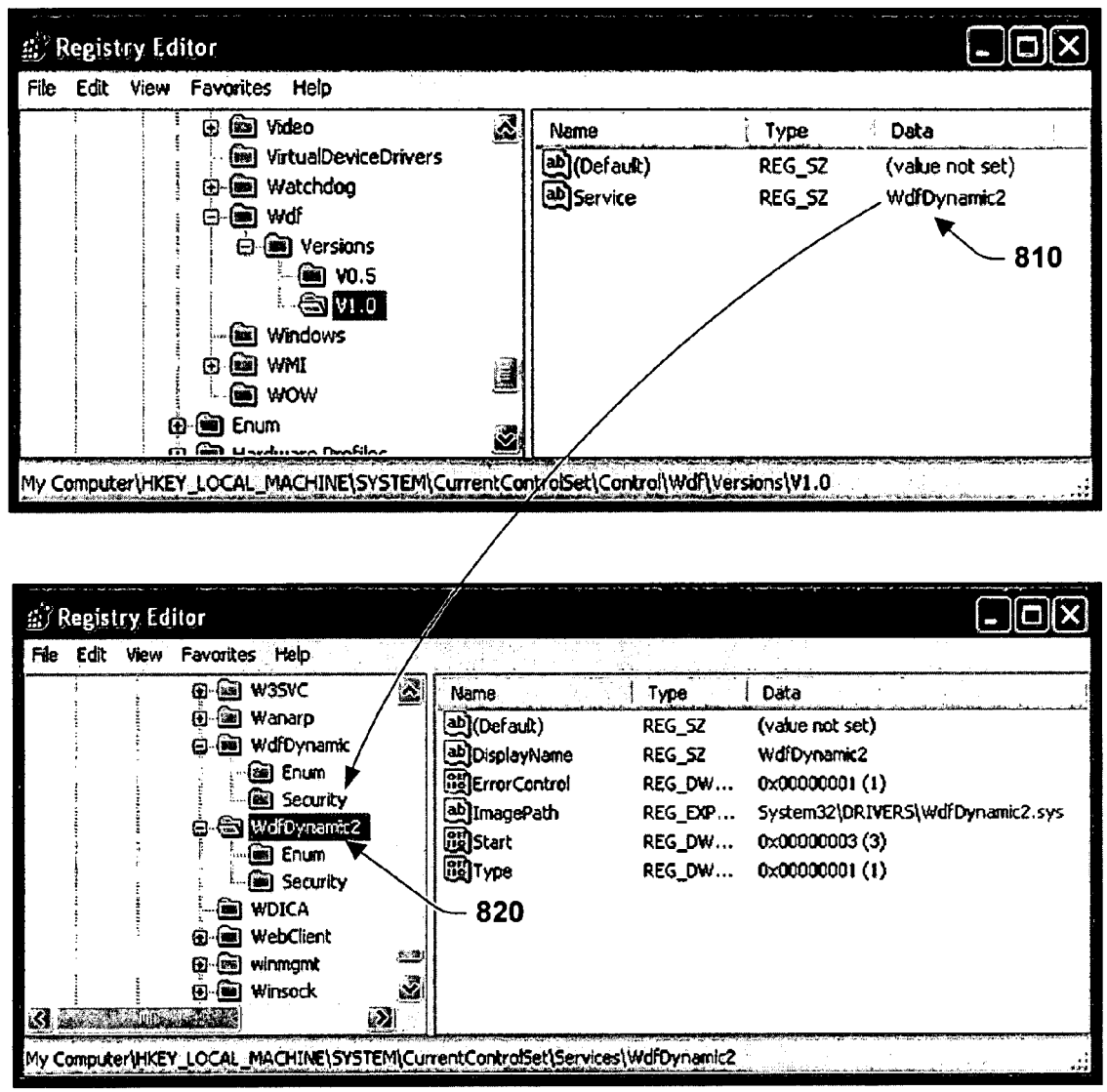
FIG. 8 illustrates an exemplary user interface in accordance with an aspect of the subject invention.

FIG. 8 illustrates an example registry layout used by a Version Loader when resolving the version binding for a client driver. In this case, a Wdf\Version\<version>registry key is formed as shown in the following code snippet.

```
//
// Build Version string
//
swprintf( instance, L"v%d.%d", Version->Major, Version->Minor );
```

Referring to FIG. 8, a dynamic element is shown at 810 within an editor interface at 810, where the dynamic element 810 is then added to a tree structure for versioning support which is shown at 820.

Figure 9:
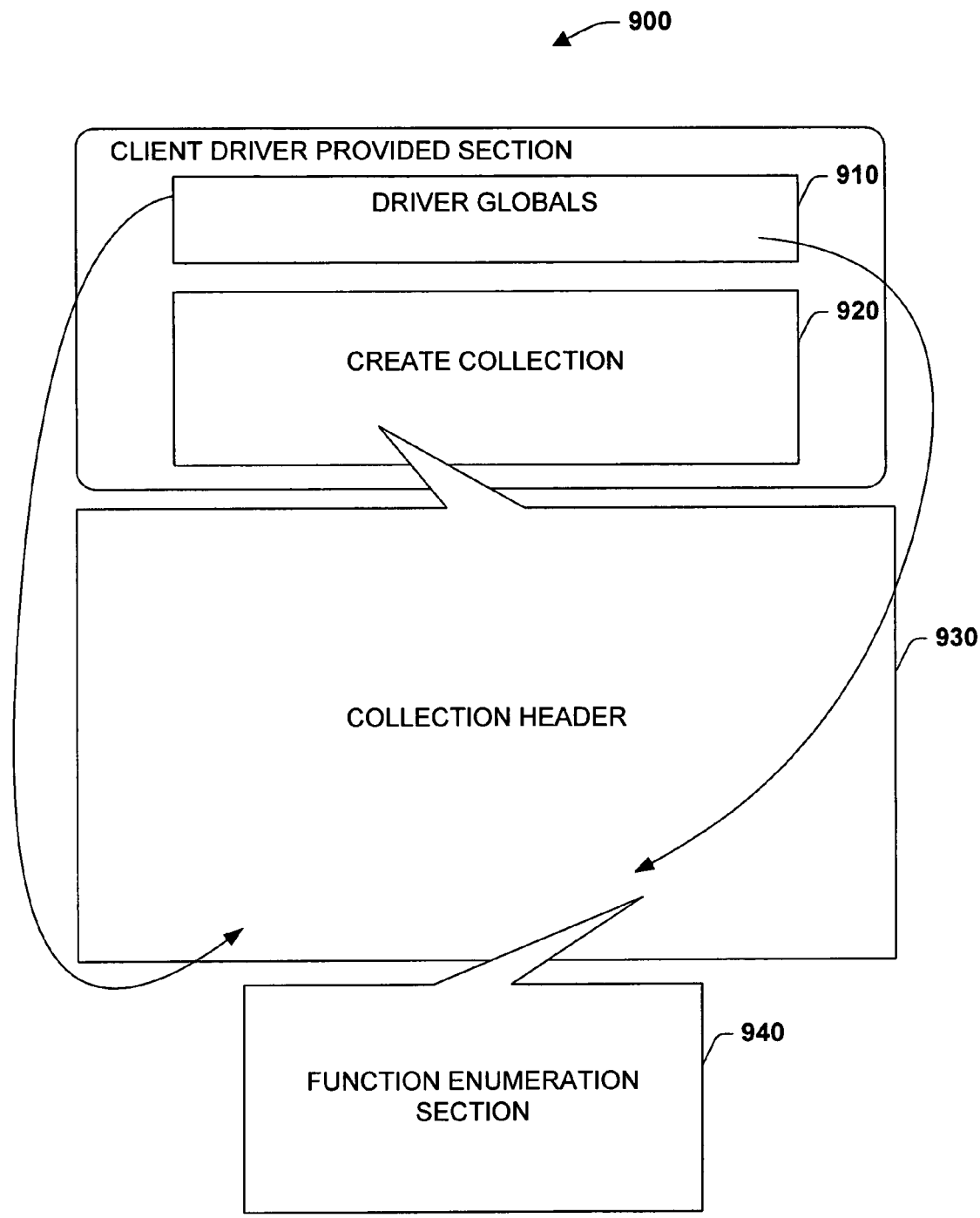
FIG. 9 illustrates exemplary API calling conventions in accordance with an aspect of the subject invention.

FIG. 9 illustrates an example layout of an API calling convention and thunking process 900. This can include a driver global declaration section 910, a create collection section 920, a collection header section 930, and a function enumeration section 940. The following code example illustrates these respective sections.

```
Section 910
PWDF_DRIVER_GLOBALS WdfDriverGlobals;
WDFFUNC WdfFunctions [enumWdfLastFunction – 1];
Section 920
WDFCOLLECTION Collection;
NTSTATUS
CreateSomeCollection( VOID )
{
    return WdfCollectionCreate( WDF_NO_OBJECT_ATTRIBUTES,
                    &Collection )
}
Section 930
        WDFCOLLECTION.H (Generated by WdfStubs.exe)
typedef
WDFAPI
WDFSTATUS
(*PFN_WDFCOLLECTIONCREATE)(
    IN PWDF_DRIVER_GLOBALS DriverGlobals,
    IN OPTIONAL PWDF_OBJECT_ATTRIBUTES
    CollectionAttributes,
    OUT WDFCOLLECTION* Collection
    );
WDFSTATUS
FORCEINLINE
WdfCollectionCreate(
    IN OPTIONAL PWDF_OBJECT_ATTRIBUTES
    CollectionAttributes,
    OUT WDFCOLLECTION* Collection
    )
{
    return ((PFN_WDFCOLLECTIONCREATE)
WdfFunctions[enumWdfCollectionCreate])
        (WdfDriverGlobals, CollectionAttributes, Collection);
}
Section 940
        WDFFUNCENUM.H (Generated by WdfStubs.exe)
typedef enum _WDFFUNCENUM {
    enumWdfCollectionCreate,
    enumWdfCollectionGetCount,
    ...
    ...
    enumWdfLastFunction
} WDFFUNCENUM;
```

It is noted that API header file (such as WDFCOLLECTION.H in the example) and WDFFUNCENUM.h are generated via a "WdfStubs.exe—dynacalls" utility, for example. Generally, all APIs are specified as FORCEINLINE functions. This allows for an easy thunking process to include with the WdfDriverGlobals parameter for every API target function.

Figure 10:
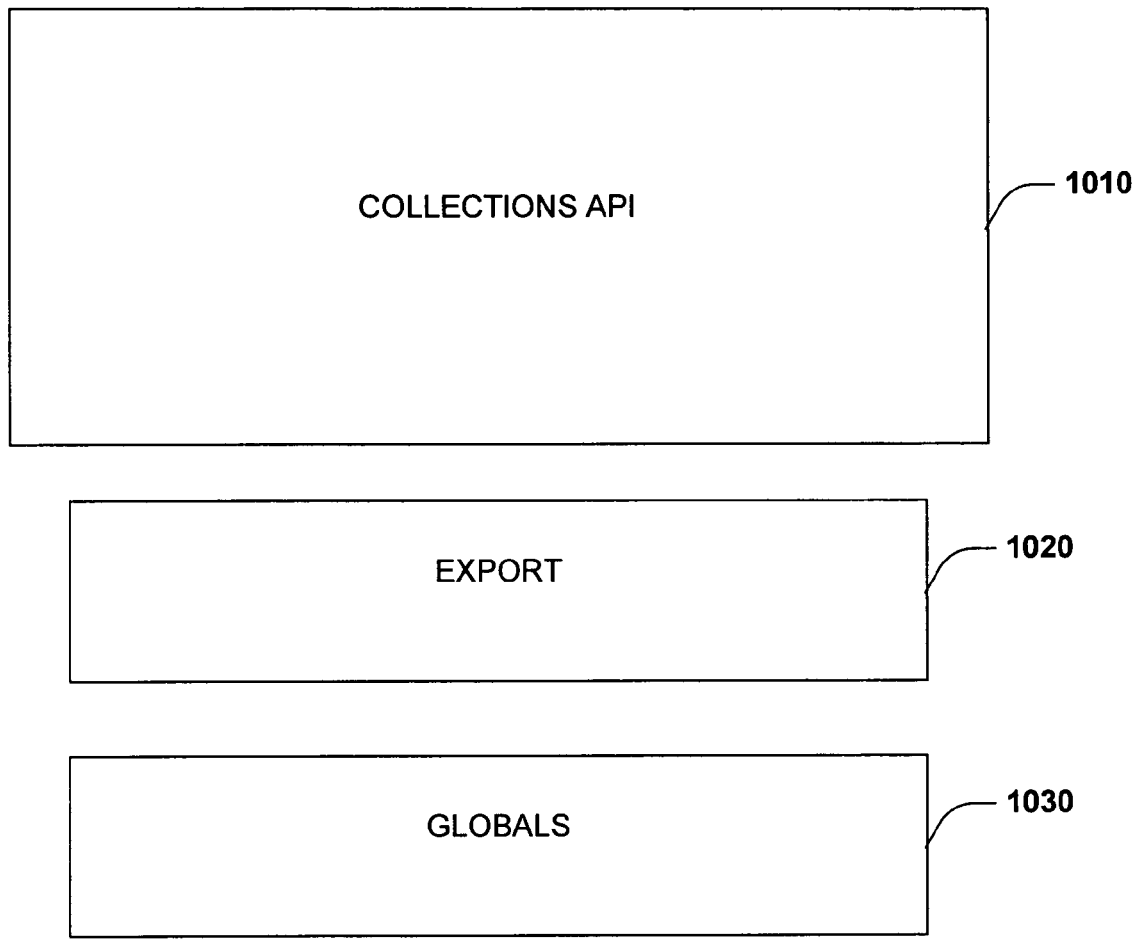
FIG. 10 illustrates exemplary API routines in accordance with an aspect of the subject invention.
Figure 11:
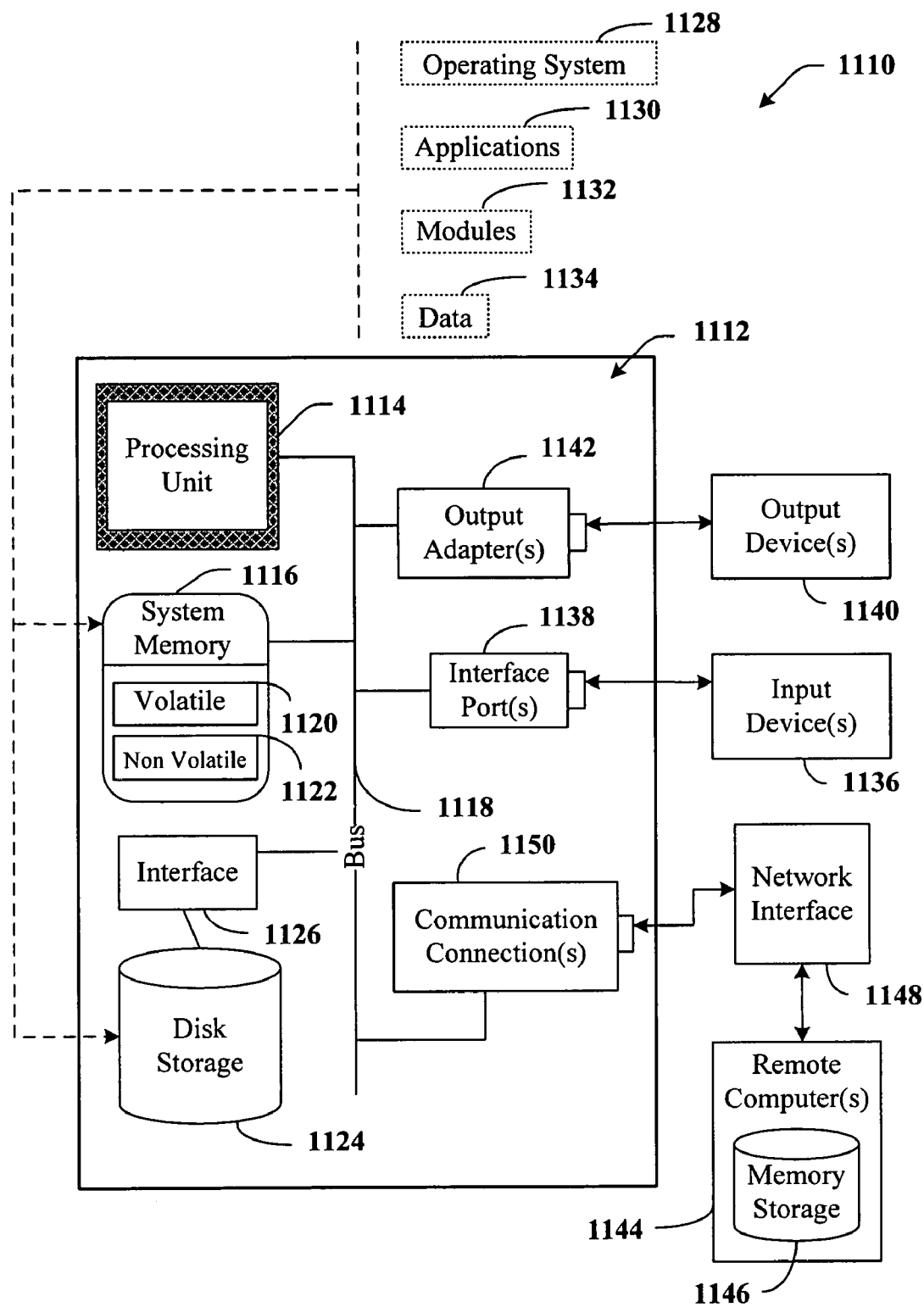
FIG. 11 is a schematic block diagram illustrating a suitable operating environment in accordance with an aspect of the subject invention.

FIG. 10 illustrates an example layout of an API routine as found in the "core" libraries noted above. This can include a collections API section 1010, an export section 1020, and a global variable declaration section at 1030. With respect to the collections section 1010, the following code example illustrates this section with bolded sections described below.

```
FxCollectionsApi.cpp extern "C" {
WDFSTATUS
WDFEXPORT(WdfCollectionCreate)( Section 10A1
    IN PWDF_DRIVER_GLOBALS DriverGlobals,
    IN OPTIONAL PWDF_OBJECT_ATTRIBUTES
```

-continued

```
FxCollectionsApi.cpp

CollectionAttributes,
    OUT WDFCOLLECTION *Collection
    )
{
    WDFSTATUS status;
    FxCollection *pCollection;
    WDFCOLLECTION hCol;
    PFX_DRIVER_GLOBALS FxDriverGlobals =
GetFxDriverGlobals(DriverGlobals);        Section 10A2
        ...
        ...
        status = FxValidateObjectAttributes(CollectionAttributes);
        if (!NT_SUCCESS(status)) {
            return status;
        }
        pCollection = new (FxDriverGlobals, FRAMEWORKS_TAG,
CollectionAttributes)                     Section 10A3
            FxCollection(FxDriverGlobals);
        ...
        ...
        return status;
    }
}
```

Regarding Section 10A1, the core library API should be named using the WDFEXPORT( ) macro. This will decorate the API name with a common prefix, which is currently "imp_" for example. Regarding Section 10A2, the common prolog to the API is retrieving the FX_DRIVER_GLOBALS pointer from the WDF_DRIVER_GLOBALS pointer, passed as the first parameter. Regarding Section 10A3, the FX_DRIVER_GLOBAL pointer is the client working context and used on most significant internal function calls. The example shows how this FX_DRIVER_GLOBALS pointer, FxDriverGlobals, is used during the construction of a new FxCollection object.

The following code example illustrates an example export section 1020.

```
Fx.hpp
#define WDFEXPORT(a) imp_ ## a
whereas, the following example illustrates a global section 1030.
FxGlobals.h
typedef struct _FX_DRIVER_GLOBALS {
    ULONG_PTR WdfHandleMask;
    LONG       WdfVerifierAllocateFailCount;
    FxDriver* Driver;
    ULONG      WdfTraceDelayTime;
    PVOID      WdfLogHeader;
    WDFPOOL    FxPoolFrameworks;
    BOOLEAN    WdfPoolTrackingOn;
    WDF_DRIVER_GLOBALS Public;
} FX_DRIVER_GLOBALS,
*PFX_DRIVER_GLOBALS;
FORCEINLINE
PFX_DRIVER_GLOBALS
GetFxDriverGlobals(
    PWDF_DRIVER_GLOBALS DriverGlobals
    )
{
    return CONTAINING_RECORD( DriverGlobals,
FX_DRIVER_GLOBALS, Public );
}
```

Figure 12:
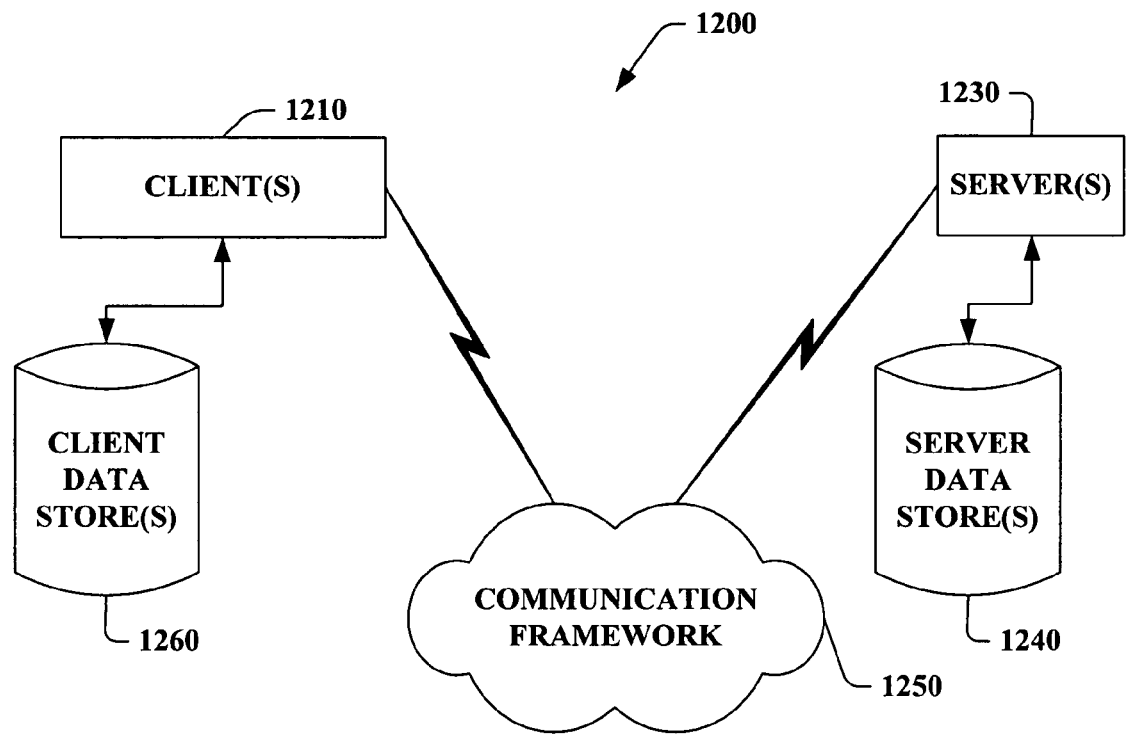
FIG. 12 is a schematic block diagram of a sample-computing environment with which the subject invention can interact.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What is claimed is:

1. A computer implemented automated computer versioning system comprising a software registration architecture, comprising:
   a computer storage medium comprising:
      a version library comprising one or more components of an operating system framework that provide a plurality of operating system functions, the version library defines revision levels and interfaces for the one or more components of the operating system framework;
      a client driver component comprising code that accesses at least one function of the plurality of operating system functions; and
      computer-executable instructions that, when executed, implement a loader that maps the code that accesses the at least one function through the interfaces in order to facilitate functional interactions of the client driver component with the operating system framework,
   wherein:
      the loader maps the interfaces based in part on the revision levels for the one or more components of the operating system framework such that updates to the one or more components of the operating system framework are available to the client driver via the interfaces without changes to the code in the client driver that accesses the at least one function, and
      when a version level change is detected, the loader implements the mapping by providing at least one of an updated address or a pointer table that points to one or more interfaces of updated components that are employed by the client driver, whereby the software registration architecture supports changes in the operating system framework without changes in core functionality code of the client driver.

2. The system of claim 1, further comprising one or more driver components that cooperate with the version library.

3. The system of claim 1, further comprising a registration component to manage revision level changes for the version library.

4. The system of claim 3, the registration component provides automated step-back functions to allow the operating system framework to regress to a previous revision level if an incompatibility is detected with a component between the client driver and the one or more updated components.

5. The system of claim 1, the version library supports static and dynamic code components.

6. The system of claim 1, further comprising a rules component to control resource removal processes.

7. The system of claim 1, further comprising an input/output (I/O) manager that interacts with the loader via the client driver.

8. The system of claim 7, the client driver further comprises a version section, a driver entry section, a driver unload section, and a status section.

9. The system of claim 1, the loader includes at least one of a bind section, a reference version section, a construct module section, and an initialize section.

10. The system of claim 1, the loader includes at least one of a version unbind section and a dereference version section.

11. The system of claim 1, wherein the client driver comprises a client function section and an internal static library section.

12. The system of claim 11, the client driver further comprises a driver entry section, a version bind section, a version unbind section, a registration section, an initialize section, and an unload section.

13. The system of claim 1, the version library is associated with a user interface that modifies registry components with respect to an operating system.

14. The system of claim 1, further comprising one or more application programming interfaces that are mapped from the version library to one or more client driver components.

15. A computer readable medium having computer readable instructions stored thereon for implementing the components of claim 1.

16. In a computer comprising a processor, a computer storage medium having stored thereon computer-executable instructions that when executed by the processor perform a method for automatically versioning an operating system whereby operating system functionality of an operating system framework that provides a plurality of operating system functions is segmented in a separate code section from core client driver functionality code of a client driver, the method comprising:

with the processor performing acts comprising:
mapping, through interfaces for one or more components of the operating system framework, code of the client driver that accesses at least one function of the plurality of operating system functions to the core client driver functionality code, the mapping includes providing at least one of an address or a pointer table that points to one or more interfaces of updated components that are employed by the client driver; and
when a version level change is detected, automatically updating the operating system framework or the core client driver functionality code in accordance with code revision level changes to the one or more components of the operating system framework, wherein the updates to the one or more components of the operating system are available to client driver via the interfaces without changes to the code in the client driver that accesses the at least one function.

17. The method of claim 16, further comprising employing at least one application programming interface to facilitate the mapping of the code of the client driver that accesses the at least one function of the plurality of operating system functions to the core client driver functionality code.

18. The method of claim 16, further comprising automatically updating the operating system framework or the core client driver functionality code according to a major or minor level revision status.

19. The method of claim 16, the operating system framework is associated with a dynamic mapping and the core client driver functionality code is associated with a static mapping.

20. A computer implemented system to facilitate computer versioning operations whereby operating system functions are separated from core client driver functions of a client driver within a code revision package, the system comprising:
means for interfacing, through interfaces for one or more components providing the operating system functions, code of the client driver that accesses the operating system functions to the core client driver functions, the interfacing includes providing at least one of an address or a pointer table that points to one or more interfaces of updated components that are employed by the client driver;
means for updating, when a version level change is detected, the operating system functions or the core client driver functions in accordance with code revision level changes to the one or more components providing the operating system functions, wherein the updates to the one or more components providing the operating system functions are made available to the client driver via the interfaces without changes to the code in the client driver that accesses the operating system functions; and
means for detecting compatibility between the operating system functions and the core client driver functions.

21. A computer implemented automated computer versioning system comprising a software registration architecture, comprising:
a computer storage medium comprising:
a version library comprising one or more components of an operating system framework that provide a plurality of operating system functions, the version library defines revision levels and interfaces for the one or more components of the operating system framework;
a client driver component comprising code that accesses at least one function of the plurality of operating system functions; and
computer-executable instructions that, when executed, implement a loader that maps the code that accesses the at least one function through the interfaces in order to facilitate functional interactions of the client driver component with the operating system framework, wherein:
the loader, when a version level change is detected, maps the interfaces based in part on the revision levels for the one or more components of an operating system framework such that updates to the one or more components of the operating system are available to the client driver via the interfaces without changes to the code in the client driver that accesses the at least one function, and
the loader implements the mapping by providing at least one of an updated address or a pointer table that points to one or more interfaces of updated components that are employed by the client driver, whereby the software registration architecture supports operating system support functions in the operating system framework and core functionality code of the client driver in the client driver;
one or more driver components that cooperate with the version library;
a registration component to manage the revision level changes for the version library, wherein the registration component provides automated step-back functions to allow the operating system framework to regress to a previous revision level if an incompatibility is detected with a component;
the version library supports static and dynamic code components;
a rules component to control resource removal processes; and
an I/O manager that interacts with the loader via the client driver wherein the client driver further comprises a version section, a driver entry section, a driver unload section, and a status section.

* * * * *